(12) United States Patent
Starr et al.

(10) Patent No.: US 7,523,289 B2
(45) Date of Patent: *Apr. 21, 2009

(54) RANDOM ACCESS STORAGE SYSTEM CAPABLE OF PERFORMING STORAGE OPERATIONS INTENDED FOR ALTERNATIVE STORAGE DEVICES

(75) Inventors: Matthew Thomas Starr, Lafyette, CO (US); Richard Douglas Rector, Arvada, CO (US)

(73) Assignee: Spectra Logic Corporation, Denver, CO (US)

( * ) Notice: Subject to any disclaimer, the term of this patent is extended or adjusted under 35 U.S.C. 154(b) by 295 days.

This patent is subject to a terminal disclaimer.

(21) Appl. No.: 11/240,893

(22) Filed: Sep. 30, 2005

(65) Prior Publication Data

US 2007/0079048 A1    Apr. 5, 2007

(51) Int. Cl.
G06F 12/00 (2006.01)
G06F 3/06 (2006.01)
G06F 13/00 (2006.01)
G06F 13/28 (2006.01)
G06F 9/26 (2006.01)
G06F 9/34 (2006.01)

(52) U.S. Cl. .......................... 711/202; 711/4; 711/114; 711/115; 711/154; 710/303; 710/304

(58) Field of Classification Search .................. 711/5
See application file for complete search history.

(56) References Cited

U.S. PATENT DOCUMENTS

| | | | |
|---|---|---|---|
| 6,324,497 B1 * | 11/2001 | Yates et al. | 703/24 |
| 6,513,051 B1 * | 1/2003 | Bolosky et al. | 707/204 |
| 6,725,394 B1 | 4/2004 | Bolt | |
| 2002/0161596 A1 | 10/2002 | Johnson et al. | |
| 2004/0025165 A1 | 2/2004 | Desoli et al. | |
| 2004/0105187 A1 | 6/2004 | Woodruff et al. | |

(Continued)

FOREIGN PATENT DOCUMENTS

WO    WO 2005/010661 A2    2/2005

OTHER PUBLICATIONS

U.S. Appl. No. 10/950,613, Starr et al.

(Continued)

*Primary Examiner*—Kevin L Ellis
*Assistant Examiner*—Ryan Bertram

(57) ABSTRACT

Disclosed are a method and apparatus for a storage system comprising at least one mobile random access storage device capable of storing first and second data on at least one docking station. The docking station is associated with an address wherein the address is identifiable by at least one host computer. A first and second sub-address are associated with the docking station wherein the first and second sub-addresses are identifiable by the host computer. The first sub-address corresponds to a first virtual device adapted for storing the first data on a first virtual media. The second sub-address corresponds to a second virtual device adapted for storing the second data on a second virtual media wherein the second virtual media is different from the first virtual media. The docking station is adapted to be responsive to the host computer as available for storing the first data at the first sub-address and the second data at the second sub-address when the docking station is operatively linked with the mobile random access storage device.

23 Claims, 13 Drawing Sheets

U.S. PATENT DOCUMENTS

| | | |
|---|---|---|
| 2004/0111251 A1 | 6/2004 | Trimmer et al. |
| 2004/0153614 A1* | 8/2004 | Bitner et al. ............... 711/162 |
| 2004/0223253 A1 | 11/2004 | Woodruff et al. |
| 2004/0264037 A1 | 12/2004 | Downey et al. |
| 2004/0264038 A1 | 12/2004 | Heineman et al. |
| 2004/0264039 A1 | 12/2004 | Armagost et al. |
| 2004/0264040 A1 | 12/2004 | Armagost et al. |
| 2004/0264041 A1 | 12/2004 | Kumpon et al. |
| 2004/0264042 A1 | 12/2004 | Pollard et al. |
| 2005/0007692 A1 | 1/2005 | Thompson et al. |
| 2005/0015713 A1 | 1/2005 | Plastina et al. |
| 2005/0033758 A1 | 2/2005 | Baxter |
| 2005/0033911 A1* | 2/2005 | Kitamura et al. ............ 711/111 |
| 2005/0047258 A1 | 3/2005 | Starr et al. |
| 2005/0057847 A1 | 3/2005 | Armagost et al. |
| 2005/0083089 A1 | 3/2005 | Starr et al. |
| 2005/0085637 A1 | 3/2005 | Lantry et al. |
| 2005/0185323 A1 | 8/2005 | Brace et al. |
| 2005/0195517 A1 | 9/2005 | Brace et al. |
| 2005/0195518 A1 | 9/2005 | Starr et al. |
| 2005/0195519 A1 | 9/2005 | Kumpon et al. |
| 2005/0195520 A1 | 9/2005 | Starr et al. |
| 2005/0219964 A1 | 10/2005 | Pollard et al. |
| 2005/0246484 A1 | 11/2005 | Lantry et al. |
| 2005/0267627 A1 | 12/2005 | Lantry et al. |

OTHER PUBLICATIONS

U.S. Appl. No. 10/951,321, Wong.
U.S. Appl. No. 10/980,594, Fenske et al.
U.S. Appl. No. 11/011,812, Starr et al.
U.S. Appl. No. 11/019,911, Curtis et al.
U.S. Appl. No. 11/037,985, Permut et al.
U.S. Appl. No. 11/040,937, Starr et al.
U.S. Appl. No. 11/089,749.
U.S. Appl. No. 11/123,725, Rector et al.
U.S. Appl. No. 11/126,025, Rector et al.
U.S. Appl. No. 11/145,768, Downey et al.
U.S. Appl. No. 11/230,146, Starr et al.
U.S. Appl. No. 11/264,920, Lantry et al.
PCT Application No. US05/45168, Spectra Logic Corporation.
PCT Application No. US05/46447, Spectra Logic Corporation.

* cited by examiner

RANDOM ACCESS STORAGE SYSTEM CAPABLE OF PERFORMING STORAGE OPERATIONS INTENDED FOR ALTERNATIVE STORAGE DEVICES

CROSS-REFERENCE TO RELATED APPLICATIONS

None.

FIELD OF THE INVENTION

The present invention relates generally to changing, in a virtual sense, a mobile random access storage device to an alternative storage device capable of storing received data intended for the alternative storage device.

BACKGROUND

Tape libraries have historically been the primary storage devices for amassed digital data. This has been due in part because of the tape libraries' ability to store considerably large amounts of data in a cost-efficient and data-stable manner. Other types of storage systems containing alternative media such as disc drives, optical storage systems and flash memory, however, are gaining momentum as a consequence of advancements in random storage access technology and relative cost improvements. These alternative storage systems take advantage of random access memory storage functionality which can dramatically speed up data transfer between a host and storage system.

Generally, a host computer is adapted to store, retrieve, and manipulate data with compatible storage systems comprising compatible storage devices operable to manage data on compatible storage media. Such storage operations are typically accomplished by using a specific data storage protocol compatible with a specific type of storage system. For example, if a host computer is adapted to store data in a tape library, communication and data transfer between the tape library and the host is typically accomplished by a tape library protocol. Some storage systems leveraging disc drive storage technology are configured to emulate a tape library and store data received from the host as if they were a tape library using the tape library protocol. Such advances are evident in a Virtual Tape Library (VTL) which is a leading alternative to the traditional tape library.

Though systems like VTLs have virtues such as improved data transfer speed and redundant storage backup using RAID, they are often limited to a fixed storage capacity, unlike the tape libraries which can use a mobile, restorable supply of tape cassettes. In addition, storage systems, such as the VTL, are further restricted to a specific data storage protocols for storing data.

In an effort to provide an improvement in versatility for storing and retrieving data with a host computer coupled with replenishable storage capacity, both methods and apparatus are proposed herein. It is to innovations related to this subject matter that the claimed invention is generally directed.

SUMMARY OF THE INVENTION

The present invention relates generally to changing a mobile random access storage device, in a virtual sense, to an alternative storage device and overcomes the disadvantages and limitations of the prior art by providing a method and apparatus for receiving and storing data intended for the alternative storage device.

Embodiment of the present invention can therefore comprise a storage system comprising: at least one mobile random access storage device capable of storing first and second data; at least one docking station; the at least one docking station associated with an address wherein the address is identifiable by at least one consumer of data; a first and second sub-address associated with the at least one docking station wherein the first and second sub-addresses are identifiable by the at least one consumer of data; the first sub-address corresponding to a first virtual device adapted for storing the first data on a first virtual media; the second sub-address corresponding to a second virtual device adapted for storing the second data on a second virtual media wherein the second virtual media is a different media type from the first virtual media; and the at least one docking station adapted to be responsive to the consumer of data as available for storing the first data at the first sub-address and the second data at the second sub-address when the at least one docking station is operatively linked with the at least one mobile random access storage device.

Another embodiment of the present invention can therefore comprise a method for saving information in a storage system comprising: receiving an inquiry from at least one consumer of data; providing an address associated with a docking station; providing a first sub-address corresponding to a first virtual device adapted for storing first data on a first virtual media and a second sub-address corresponding to a second virtual device adapted for storing second data on a second virtual media wherein the second virtual media is a different media type than the first virtual media and wherein the first and second sub-addresses are associated with the first address; operatively linking a mobile random access storage device with the docking station; responding to the consumer of data that the first virtual device at the first sub-address is available for storing the first data and the second virtual device at the second sub-address is available for storing the second data; storing the first data received from the consumer of data at the first sub-address on the mobile random access storage device.

Yet another embodiment of the present invention can therefore comprise a storage system comprising: at least one mobile random access storage device capable of storing first and second data; at least one docking station adapted to receive and transmit the first and second data; the at least one mobile random access storage device adapted to function as a first and a second virtual of storage device wherein the first virtual device is different from the second virtual device; the at least one mobile random access storage device capable of storing the first data intended for storage on the first virtual storage device and the second data intended for storage on the second virtual storage device when the at least one mobile random access storage device is operatively linked with the at least one docking station.

Yet another embodiment of the present invention can therefore comprise a storage system comprising: at least one mobile random access storage device capable of storing sequential data and random data; at least one docking station adapted to receive and transmit the sequential data and the random data; the at least one mobile random access storage device adapted to function as a virtual sequential storage device and a virtual random storage device; the at least one mobile random access storage device capable of storing the sequential data intended for storage on the virtual sequential storage device and the random data intended for storage on the virtual random storage device when the at least one mobile random access storage device is operatively linked with the at least one docking station.

Yet another embodiment of the present invention can therefore comprise a storage system comprising: at least one mobile random access storage device capable of storing sequential data and random data; at least one docking station; the at least one docking station associated with an address wherein the address is identifiable by at least one consumer of data; a first and second sub-address associated with the at least one docking station wherein the first and second sub-addresses are identifiable by the at least one consumer of data; the first sub-address corresponding to a virtual sequential storage device adapted for storing the sequential data on a virtual sequential storage media; the second sub-address corresponding to a virtual random storage device adapted for storing the random data on a virtual random storage media; and the at least one docking station adapted to be responsive to the at least one consumer of data as available for storing the sequential data at the first sub-address and the random data at the second sub-address when the at least one docking station is operatively linked with the at least one mobile random access storage device.

Yet another embodiment of the present invention can therefore comprise a method of storing data on a random access storage medium adapted for mobility when used in a storage system capable of comprising a plurality of the mobile random access storage media, comprising the steps of: designating a first portion of the random access storage medium as a first virtual storage device and a second portion of the random access storage medium as a second virtual storage device that is different from the first virtual storage device; assigning an identifying indicia to the first virtual storage device; and informing a consumer of data as to the existence of the first virtual storage device.

DETAILED DESCRIPTION

Figure 1:
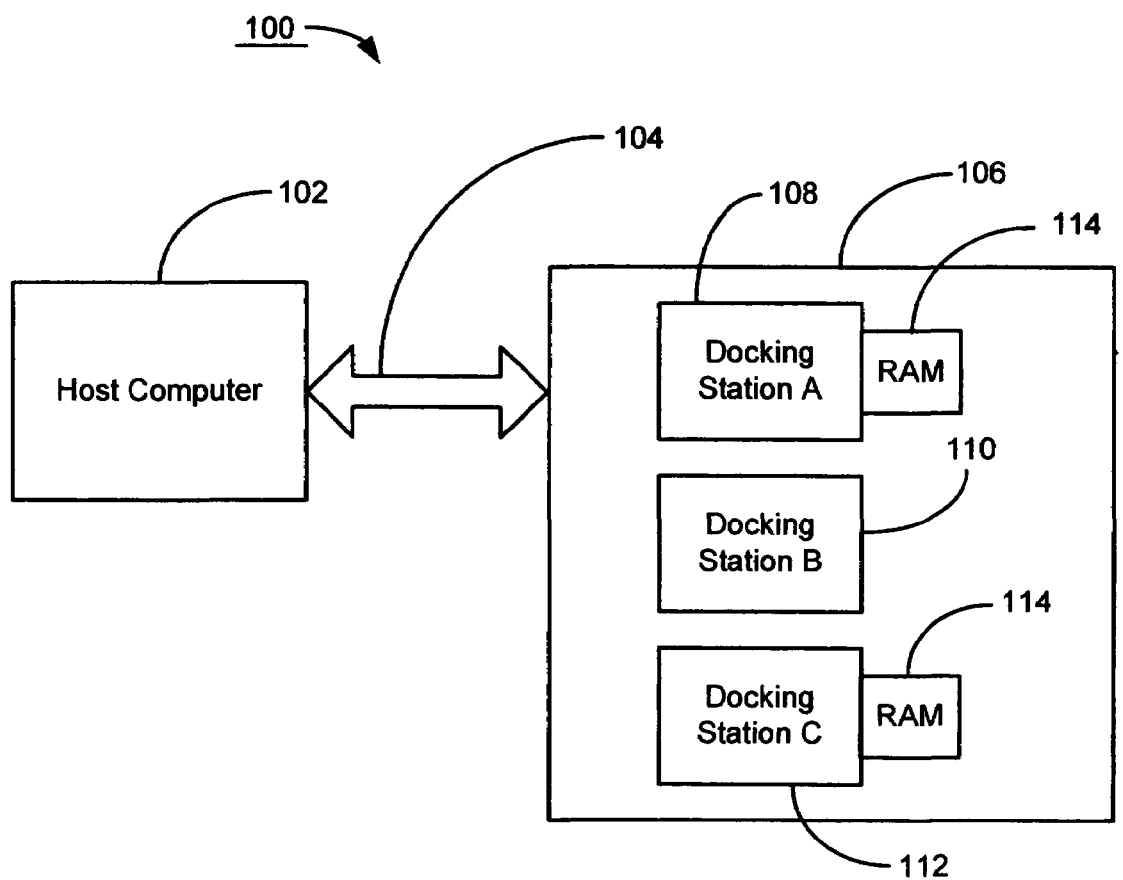
FIG. 1 is a block diagram of a data storage arrangement constructed in accordance with an embodiment of the present invention.

Referring to the drawings in general, and more specifically to FIG. 1, shown therein is a block diagram of a data storage arrangement 100 constructed in accordance with an embodiment of the present invention. In what follows, similar or identical structure is identified using identical callouts.

A host computer 102 is one embodiment of a consumer of data; other embodiments can also include another storage system 106 or a streaming output device such as a video server, just to name several examples. A consumer of data is an entity, or entities, that is capable of "taking in" data, for example a host computer 102 is a consumer when receiving data and a storage system 106 is a consumer when receiving data. As one skilled in the will appreciate, in addition to "taking in" data, a consumer of data is also generally capable of transmitting data. The host computer 102 can be a personal computer, a main frame computer, a server, or any computer system capable of communication with the storage system 106, just to name a few examples. The communication path 104, at a minimum, needs only to facilitate communication between the host computer 102 and the storage system 106. The means for communication can be accomplished by a dedicated pathway (such as a SCSI [Small Computer Systems Interface] cabled connection) or, in an alternative embodiment, a pathway over a network (such as a LAN, WAN, or other communication architecture), for example. Furthermore, the communication path can be in the form of a wire line pathway, wireless, or a combination thereof, for example.

The storage system 106 is capable of storing and retrieving data for the host 102 by means of using at least one docking station, such as docking station A 108, docking station B 110 and docking station C 112. Docking stations A 108 and C 112 are each operatively linked with a mobile Random Access Memory (RAM) device 114, wherein the mobile RAM storage devices 114 are adapted to store data received from the host computer 102 via the docking stations. A mobile RAM storage device 114 is capable of storing random data that is not constrained by a linear format such as tape for example. In one embodiment, a mobile RAM storage device 114 can be inserted in the docking station, such as docking station A 108; however the mobile RAM storage device 114 need only be operatively linked to a docking station to store data received via the docking station. Docking station B 110 is not operatively linked with a mobile RAM storage device 114 and hence is unable to store data received beyond any storage capacity docking station B 110 may comprise, such as Dynamic RAM for example. For purposes of illustration, communication with the storage system 106 is considered communication with the storage system 106 generally and/or communication directly with components that comprise the storage system 106. A docking station, such as docking station A 108, is an apparatus that is capable of coupling with a mobile RAM storage device, such as mobile RAM storage device 114, for storage operations. Several examples of a docking station include a USB port capable of receiving a USB device, a PCMCIA for receiving a PC-card, a disc drive or disc drive magazine receptacle, serial port connection(s), parallel port connection(s), or any other such apparatus capable of transmitting and receiving data to a storage device via wire line or wireless just to name several examples.

Figure 2:
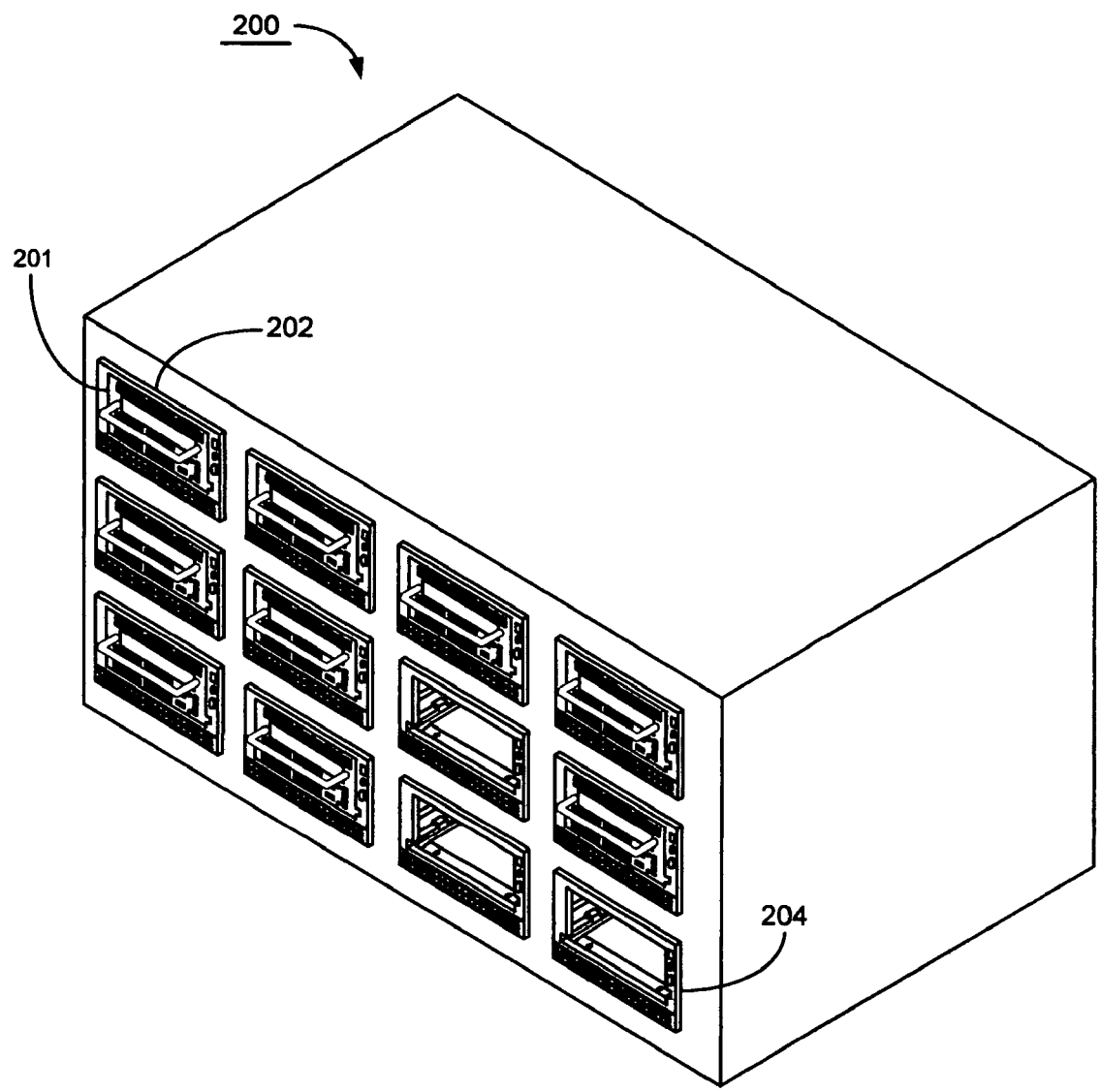
FIG. 2 shows an example of a storage system wherein the present invention can be practiced in accordance with some embodiments of the present invention.

FIG. 2 shows an example of a storage system 106 in accordance with one embodiment of present invention. Here, an RXT Bank of Drives disc drive magazine library 200 from Spectra Logic Corp. of Boulder, Colo. comprises a plurality of random access memory devices (in this example disc drive magazines 201) and docking stations 202 operatively linked to one another to function as the RXT library 200. The disc drive magazines 201 are adapted for mobility, and can be removed from or inserted into a docking station 202, as illustrated by a vacant docking station 204 capable of receiving a disc drive magazine 201, for example. The RXT library 200 is capable of communicating with a host, such as the host 102, via a sequential storage protocol, such as a tape library protocol used for streaming data to store on tape medium for example.

Figure 3:
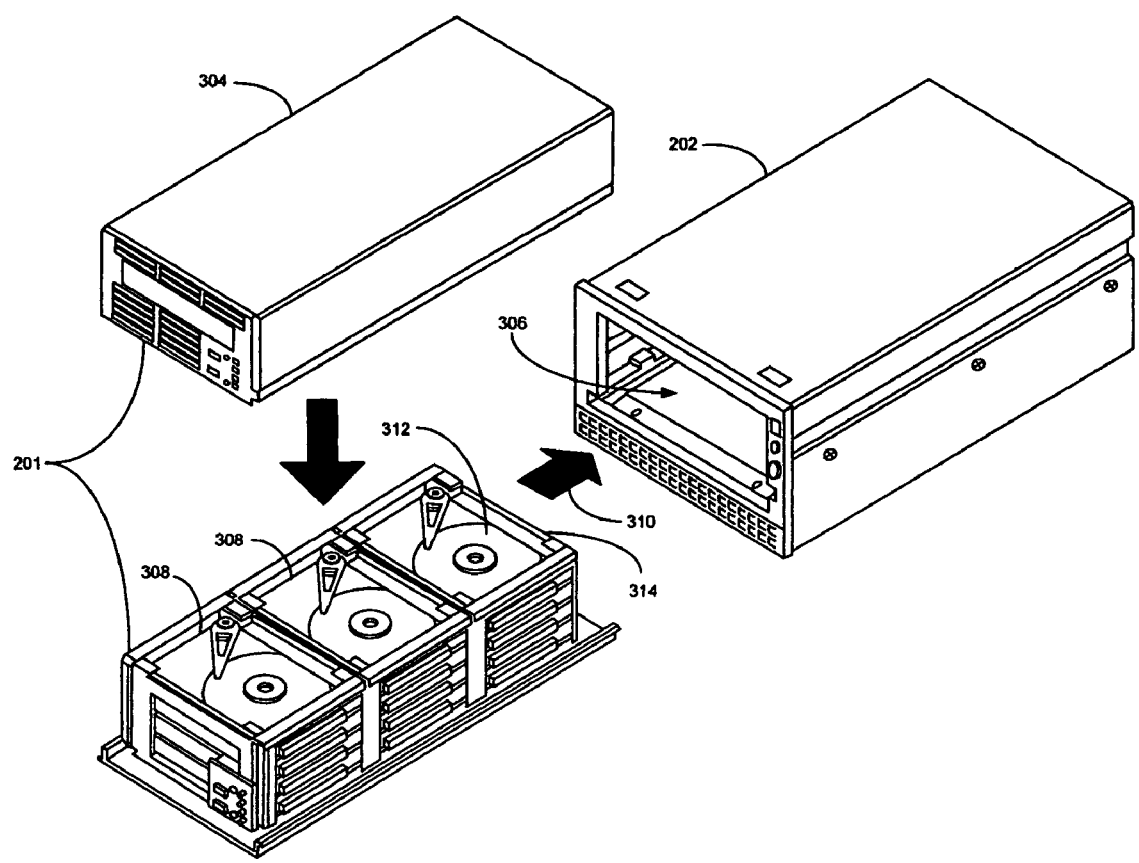
FIG. 3 shows an illustration of an embodiment of an RXT disc drive magazine and docking station wherein the present invention can be practiced in accordance with some embodiments of the present invention.

FIG. 3 shows a more detailed illustration of an embodiment of an RXT disc drive magazine 201 and docking station 202. Here, a plurality of disc drives 308 are shown substantially contained by an enclosure 304 generally comprising the mobile disc drive magazine 201. A conventional magnetic disc drive 308 is only one embodiment of a RAM storage device according to the present invention, which, in further embodiments, can include flash memory or optical memory, just to name a few (see below). The illustrative mobile disc drive magazine 201 is adapted to be received by an opening 306 in the docking station 202 as shown by the arrow 310. While the docking station 202 is shown as one of a number of stations in the library 200, one of ordinary skill will appreciate that the docking station 202, by itself, could be used as a stand-alone storage system. The engaging surface 314 of the mobile disc drive magazine 201 is adapted with electrical contacts (not shown) to contact with complementary electrical contacts (not shown) on the engaging surface (not shown) of the docking station 202. When contact is made, the RXT disc drive magazine 201 is considered operatively linked with the docking station 202 whereby the transmission of data can occur between the docking station 202 and the mobile disc drive magazine 201. Furthermore, power can be optionally provided to the mobile disc drive magazine 201 by the docking station 202. Power and data transmission provide a cooperatively linked state between the mobile disc drive magazine 201 and the docking station 202. The docking station 202 is capable of being communicatively connected with a host computer, such as the host computer 102, or other storage device/s, such as the RXT storage library 200 for example, by a coupling means, such as wires, plugs-in, wireless transmission (e.g., IR, RF) or any combination or equivalence thereof. By linking the docking station 202 with the storage system 200, a connected disc drive magazine 201 is effectively in a cooperatively linked state with the storage system 200.

While the claimed invention has utility in any number of different applications, the RXT disc drive magazine library 200 has been provided to illustrate a suitable environment in which the claimed invention can be practiced. Here, the disc drive magazine 201 is an embodiment of a RAM storage device, such as RAM storage device 114. Other RAM storage devices can include a Compact Disc Read Only Memory (CDROM) for use with a Compact Disc (CD) or other optical storage media, magneto optical systems, disc drive, disc drive magazine comprising multiple disc drives, flash memory devices (such as a compact flash), floppy disc drive system and RAM semiconductor memory (i.e., an SDRAM, for example).

Figure 4A:
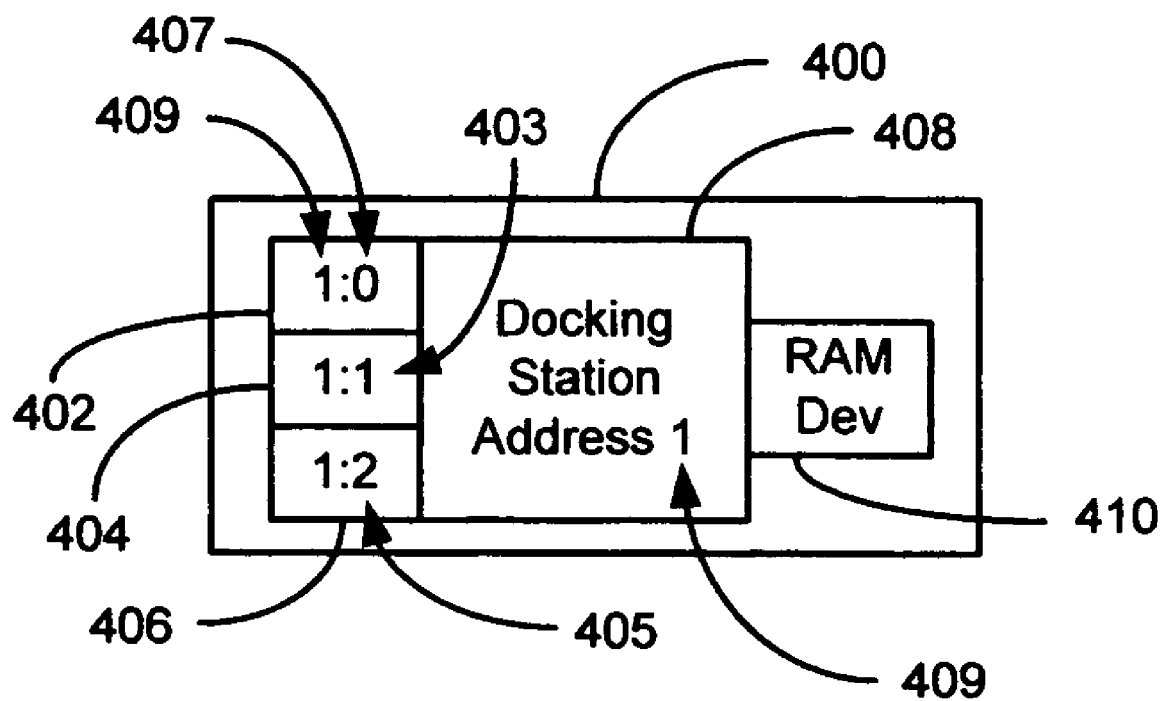
FIGS. 4A and 4B are block diagrams showing virtual storage devices with respective virtual media associated with a docking station consistent with some embodiments of the present invention.
Figure 4B:
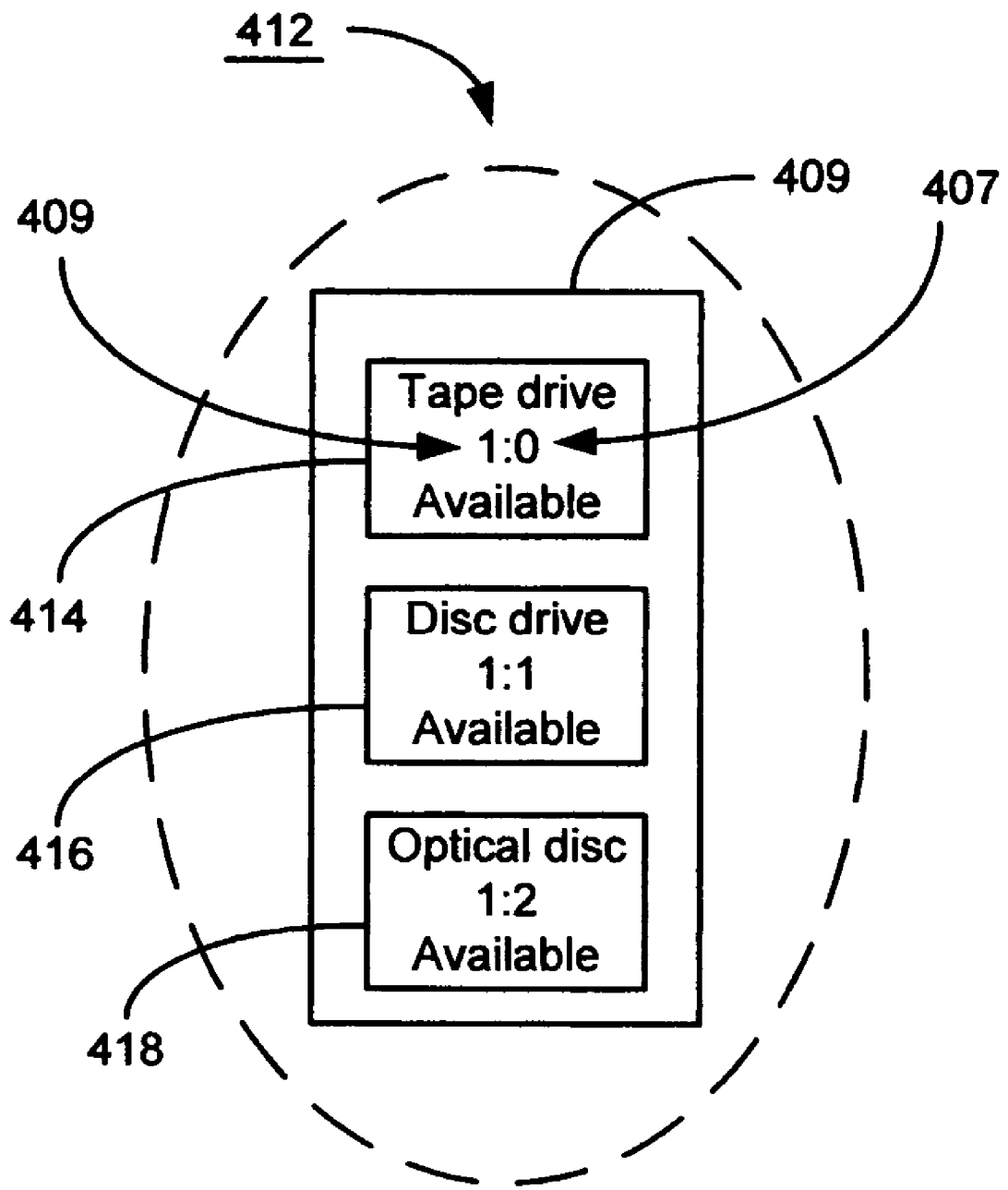

FIGS. 4A and 4B are block diagrams showing virtual storage devices with respective virtual media 412 associated with a docking station 408 consistent with an embodiment of the present invention. Referring to FIG. 4A, a storage system 400 comprises a docking station 408 wherein the docking station 408 is associated with an address, in this case address [1] 409. The docking station 408 further comprises three sub-addresses [0] 407, [1] 403 and [2] 405. Herein, address [1] 409 colon sub-address [0] 407 is the convention used to show address:sub-addresses as illustrated by address:sub-address blocks 1:0 402, 1:1 404 and 1:2 406. In one embodiment, the sub-addresses [0] 407, [1] 403 and [2] 405 can be Logical Unit Numbers (LUNs). Both the address 405 and sub-addresses 407 are capable of being identified by a host computer, such the host computer 102. As shown here, the docking station 408 is operatively linked with a mobile RAM storage device 410. Hence, the address:sub-addresses 1:0 402, 1:1 404 and 1:2 406 are available for storage operations. As one skilled in the art will appreciate, though three sub-addresses are used herein for illustrative purposes, a docking station, such as the docking station 408, is not necessarily limited to the three sub-addresses [0] 407, [1] 403 and [2] 405 and the three virtual storage devices 414, 416 and 418 shown, and may comprise any desired number of sub-addresses and storage devices.

FIG. 4B shows as a virtual docking station representation 412 the docking station 408 at address [1] 409 consistent with embodiments of the present invention. Herein, the sub-addresses 407 correspond to three virtual storage devices capable of storing data on three respective virtual storage medium type and more specifically to the three address:sub-address blocks 1:0 402, 1:1 404 and 1:2 406. As will be appreciated by a skilled artisan, the three virtual devices can all be different devices, all be the same, or comprise any desired combination thereof. In this example, sub-address [0] 407 from block 1:0 402 corresponds to a virtual tape drive system 414, sub-address [1] 403 from block 1:1 404 corresponds to a virtual disc drive system 416, and sub-address [2] 405 from block 1:2 406 corresponds to a virtual optical disc system 418 capable of cooperating with (virtual) removable optical discs capable of data storage. Furthermore, because the mobile RAM storage device 410 is operatively linked with the docking station 408, address:sub-addresses 1:0 402, 1:1 404 and 1:2 406 are all available for storage operations. Hence, the docking station [1] 408 is adapted to be responsive to a host computer, such as host computer 102, as available for storage operations as a (virtual) tape drive system 414 at 1:0 402, a disc drive system 416 at 1:1 404 and an (virtual) optical disc system 418 at 1:2 406. The virtual disc drive system 416 is adapted to store data received as random data in a random data protocol or format, the virtual tape drive system 414 is adapted to store data received as sequential data in a sequential data protocol, and the virtual optical disc system 418 is adapted to store data received as random data in a random data protocol. In one embodiment, the virtual storage device "seen" by the host computer 102 can be a mobile RAM storage device functioning as itself, e.g., the mobile RAM storage device 410. Hence, a virtual device and virtual media can include the actual mobile RAM storage device 410 as the device capable of storing data on a media.

Figure 5:
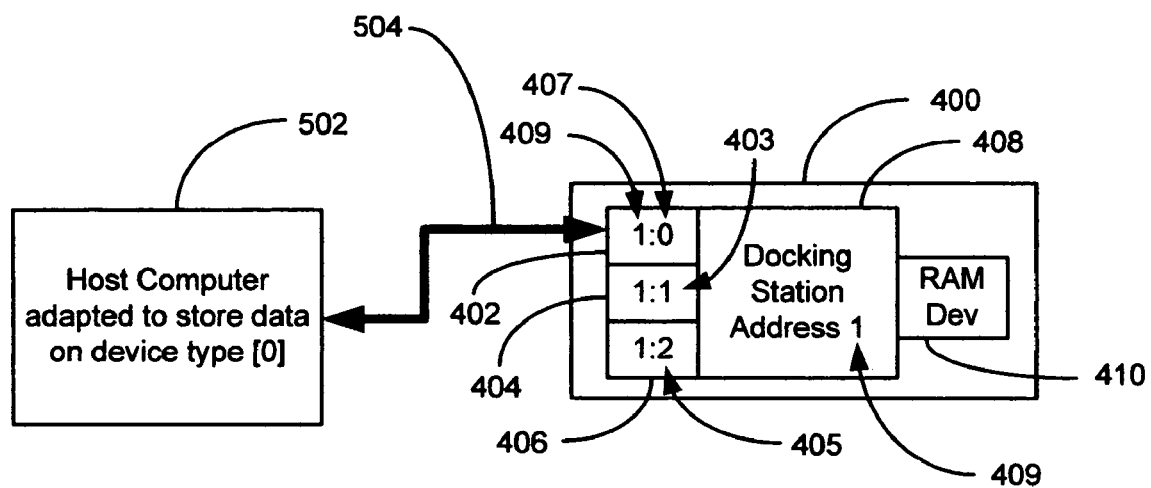
FIG. 5 shows a block diagram illustrating a host computer communicating with a storage system consistent with an embodiment of the present invention.

FIG. 5 shows a block diagram illustrating a host computer 502 communicating 504 with the storage system 400 consistent with an embodiment of the present invention. As previously disclosed in FIG. 4A, the illustrative storage system 400 comprises a docking station 408 at address [1] 409 operatively linked with a mobile RAM storage device 410. Three sub-addresses [0] 407, [1] 403 and [2] 405 are also associated with the docking station 408 corresponding to three virtual storage devices. In this embodiment, the host computer 502 is adapted to store (or, at least, prefers to store) data on a device type [0] which is identified by the docking station 408 as being at the address:sub-address 1:0 402. Address:sub-address 1:0 402 is shown to the host computer 502 as being available for storage operations. As discussed in conjunction with FIG. 4B, the host computer 502 could illustratively be adapted to store data on a tape drive using a sequential storage protocol intended for a tape drive, such as a streaming protocol. The docking station 408 is capable of storing data received for a tape drive in sequential storage protocol at address:sub-address 1:0 402 which corresponds to the virtual tape drive 409. Hence, the docking station 408 is responsive to the host computer 502 as being available for storing sequential data intended for a tape drive loaded with a tape cassette at sub-address [0] 407. The docking station 408 is also responsive to the host computer 502 indicating that both a disc drive system 416 at sub-address [1] 403 and an optical disc system 418 at sub-address [2] 405 are also available for storage operations. Herein, the host computer 502 is engaged in storage operations 504 with the docking station 408 via the address:sub-address 1:0 402 which is the storage device of choice for the host computer 502 (i.e. a storage device compatible with the storage requirements of the host computer 502). In another embodiment, the docking station 408 is adapted to automatically configure itself to a virtual storage device capable of storing data for the host computer 502 activated by communication with the host computer 502 (i.e. by first recognizing the protocol with which the host computer 502 attempts to communicate or with which the host computer 502 prefers to communicate).

Figure 6:
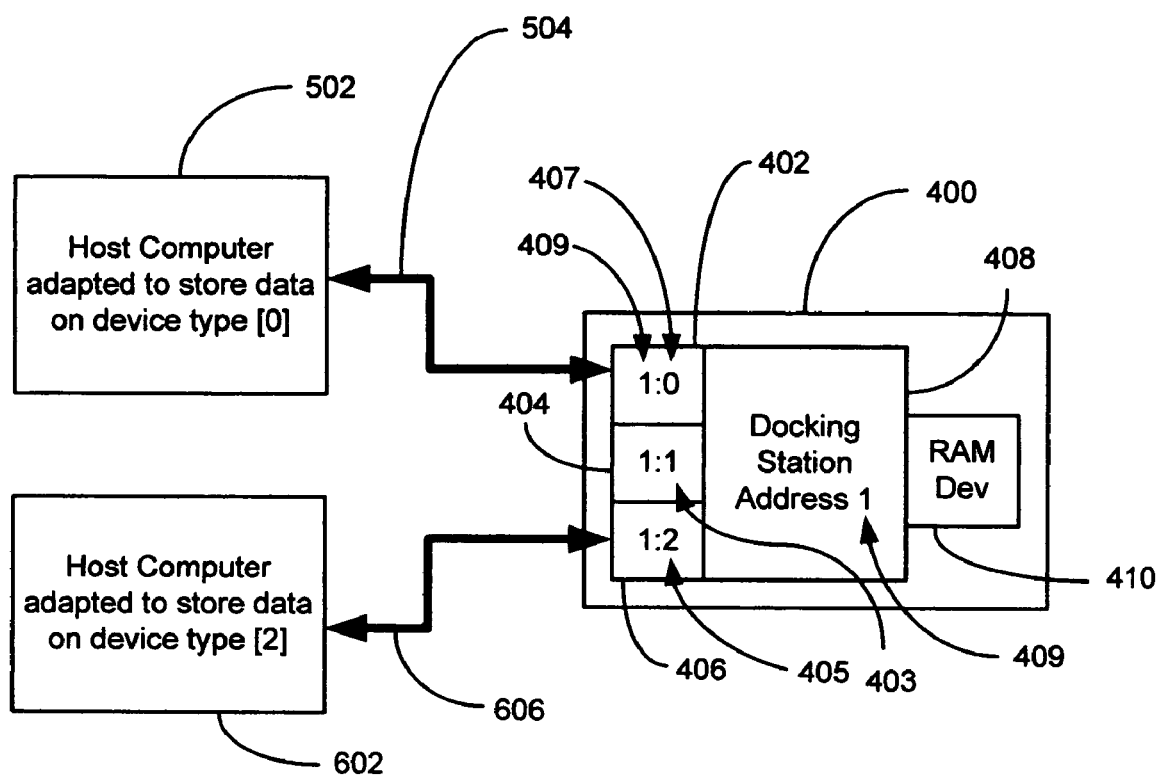
FIG. 6 shows a block diagram illustrating two host computers in communication with a storage system consistent with some embodiments of the present invention.

FIG. 6 shows a block diagram illustrating two host computers 502 and 604 in communication 504 and 606 with the storage system 400 consistent with an embodiment of the present invention. As previously described, the storage system 400 comprises a docking station 408 at address [1] 409 operatively linked with a mobile RAM storage device 410. Three sub-addresses [0] 407, [1] 403 and [2] 405 are also associated with the docking station 408 corresponding to three virtual storage devices. In this embodiment, a first host computer 502 is adapted to store data on a first device type [0], which is identified by the docking station 408 as being at the address:sub-address 1:0 402, and a second host computer 602 is adapted to store data on a second device type [2] which is identified by the docking station 408 as being at the address:sub-address 1:2 406. Both address:sub-address 1:0 402 and 1:2 406 are shown as being available for storage operations herein. By way of example, the first host computer 502 could be adapted (or, at least, prefer to) to store data on a tape drive using a sequential storage protocol, such as a streaming protocol, and the second host computer 602 could be adapted to store data on an optical disc system 418 using a random storage protocol intended for an optical disc system, such as a protocol unconstrained by linear data storage. The docking station 408 is capable of storing data received for a tape drive in a sequential storage protocol at address:sub-address 1:0 402 which corresponds to the virtual tape drive 414. The docking station 408 is also capable of storing data received in a random storage protocol at address:sub-address 1:2 406 which corresponds to the virtual optical storage system 418. Hence, the docking station is responsive to the first host computer 502 as available for storing sequential data intended for a tape drive loaded with a tape cassette at sub-address [0] 407 and to the second host computer 602 as available for storing random data intended for an optical disc system loaded with an optical disc at sub-address [2] 405. In the illustrative embodiment of FIG. 6, the first host computer 502 is engaged in first storage operation 504 with the docking station 408 via the address:sub-address 1:0 402 which is the storage device of choice for the first host computer 502 (i.e. a storage device compatible with the storage requirements of the first host computer 502), and the second host computer 602 is engaged in second storage operation 606 with the docking station 408 via the address:sub-address 1:2 406 which is the storage device of choice for the second host computer 602 (i.e. a storage device compatible with the storage requirements of the second host computer 602).

Both the first 502 and second 602 host computers can be engaged in first 504 and second 606 storage operations (i.e. storing first and second data) at substantially the same time. Alternatively, the docking station 408 can be responsive to the second host computer 602 as available for second storage operations 606 at sub-address [2] 405 after an amount of time following storage commencement of the first storage operations 504 when received by the first host computer 502 first, prioritizing storage activity on a "first come, first serve" basis. As will be appreciated by a skilled artisan, the "first come, first serve" response could be with one host computer, such as the host computer 502, requesting data storage at both the sub-address 1:0 402 and 1:2 406, for example, or with multiple host computers. The amount of time can be predetermined or determined by the capability of the docking station 408 to adequately fulfill the storage needs of the first host computer 502 before engaging 606 the second host computer 602. "First come, first serve" priority may be appropriate if there exists, for example, a system requirement whereby a buffer memory may receive a portion of first data 504 from the first host computer 502 and while the buffer is transmitting the portion of first data 504 for storage at sub-address 1:0 402, the buffer may be able to receive second data 606 for storage at the sub-address 1:2 406, for example. Priority may be due to one controller handling all host computer 502 and 602 requests for storage. In an alternative embodiment, the amount of time following storage commencement of first data 504 received first can be zero whereby each sub-address [0] 407, [1] 403 and [2] 405 can have independent controller and buffer functionality, for example, capable of storing data on portions of the mobile RAM storage device 410 without time delays.

Figure 7:
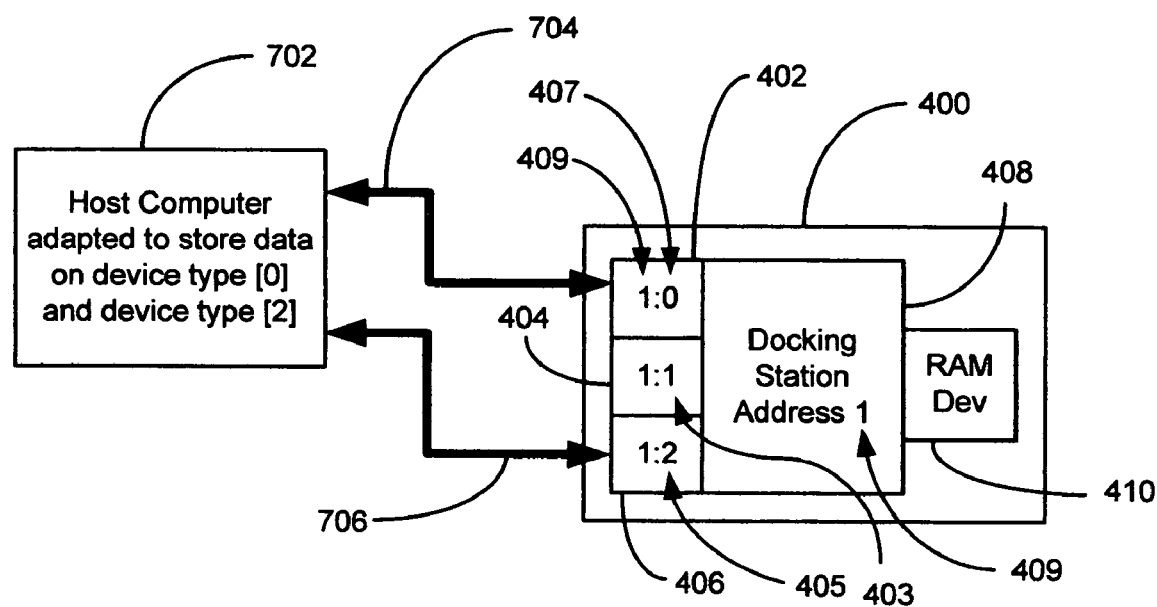
FIG. 7 shows a block diagram illustrating a host computer in dual communication with a storage system consistent with some embodiments of the present invention.

FIG. 7 shows a block diagram illustrating a host computer 702 in dual communication 704 and 706 with the storage system 400 consistent with some embodiments of the present invention. As previously described, the storage system 400 comprises a docking station 408 at address [1] 409 operatively linked with a mobile RAM storage device 410. Three sub-addresses [0] 407, [1] 403 and [2] 405 are also associated with the docking station 408 corresponding to three virtual storage devices. In this embodiment, the host computer 702 is adapted to store data on a first device type [0] and a second device type [2]. These device types are identified by the docking station 408 as being at the address:sub-address 1:0 402 and 1:2 406. Herein, both address:sub-address 1:0 402 and 1:2 406 are shown as being available for storage operations. In the example of FIG. 7, the host computer 702 is adapted to store first data 704 on a tape drive using a sequential storage protocol, such as a streaming protocol, and second data 706 on an optical disc system 418 using a random storage protocol, such as a protocol unconstrained by linear data storage. The docking station 408 is capable of storing data received for a tape drive in a sequential storage protocol at address:sub-address 1:0 402 which corresponds to the virtual tape drive 409. The docking station 408 is also capable of storing data received in a random storage protocol at address:sub-address 1:2 406 which corresponds to the virtual optical storage system 418. Hence, the docking station is responsive to the host computer 702 as being available for both storing sequential data intended for a tape drive loaded with a tape cassette at sub-address [0] 407 and storing random data intended for an optical disc system loaded with an optical disc at sub-address [2] 405. Herein, the host computer 702 is engaged in first storage operations 704 with the docking station 408 via the address:sub-address 1:0 402 and second storage operations 706 with the docking station 408 via the address:sub-address 1:2 406. In an alternative embodiment, the host computer 702 is engaged in first 704 and second 706 storage operations (i.e. storing first and second data) at substantially the same time. In yet another alternative embodiment, the principles of "first come, first serve" can apply to the first storage operation 704 and the second storage operation 706, whereby the sub-address 1:0 402 gives the host computer 702 storage priority to the first storage operation 704 if the first storage operation 704 commences before the second storage operation 706.

Figure 8:
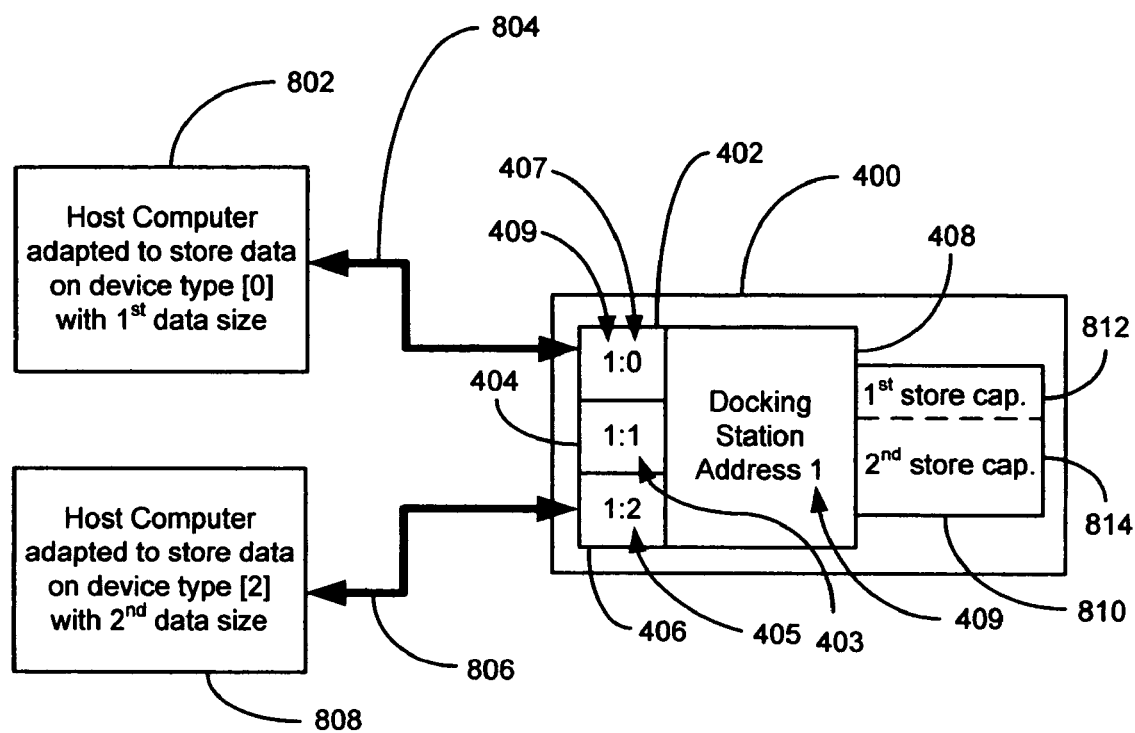
FIG. 8 shows a block diagram illustrating two host computers having data size requirements for storing data in communication with a storage system consistent with some embodiments of the present invention.

FIG. 8 shows a block diagram illustrating two host computers 802 and 808 having data size requirements for storing data in communication 804 and 806 with the storage system 400 consistent with some embodiments of the present invention. The storage system 400 comprises a docking station 408 at address [1] 409 operatively linked with a mobile RAM storage device 810. Three sub-addresses [0] 407, [1] 403 and [2] 405 are also associated with the docking station 408 corresponding to three virtual storage devices. In this embodiment, a first host computer 802 is adapted to store first data having a first data size on a first device type [0] (adapted to use with a first media type [0]) which is identified by the docking station 408 as being at the address:sub-address 1:0 402 and a second host computer 602 is adapted to store second data having a second data size on a second device type [2] (adapted to use with a second media type [2]) which is identified by the docking station 408 as being at the address:sub-address 1:2 406. Both address:sub-address 1:0 402 and 1:2 406 are shown as being available for storage operations herein. In this example, the first host computer 802 is adapted to store the first data 804 of a first data size on a tape drive using a sequential storage protocol intended for tape, such as a streaming protocol, and the second host computer 808 is adapted to store the second data 806 of a second size on an optical disc system 418 using a random storage protocol, such as a protocol unconstrained by linear data storage. The docking station 408 is capable of storing data received for a tape drive in a sequential storage protocol at address:sub-address 1:0 402 which corresponds to the virtual tape drive 409. The docking station 408 is also capable of storing data received in a random storage protocol intended for an optical storage system at address:sub-address 1:2 406 which corresponds to the virtual optical storage system 418. The mobile RAM storage device 810 comprises a first storage capacity 812 that is available for storing the first data at address:sub-address 1:0 402 and a second storage capacity 814 that is available for storing the second data at address:sub-address 1:2 406. Hence, the docking station is responsive to the first host computer 802 as being available for storing sequential data intended for a tape drive loaded with a tape cassette at sub-address [0] 407 if the first storage capacity 812 is greater than the first data size, and to the second host computer 808 as available for storing random data intended for an optical disc system loaded with an optical disc at sub-address [2] 405 if the second storage capacity 814 is greater than the second data size. Herein, the first host computer 802 is engaged in first storage operations 804 with the docking station 408 via the address:sub-address 1:0 402 which is the storage device of choice for the first host computer 802 (i.e. a storage device compatible with the storage requirements of the first host computer 802) and the second host computer 808 is engaged in second storage operations 806 with the docking station 408 via the address:sub-address 1:2 406 which is the storage device of choice for the second host computer 808 (i.e. a storage device compatible with the storage requirements of the second host computer 808). As can be appreciated by a skilled artisan, first data 804 can be stored on the mobile RAM storage device 810 even if the first data size exceeds the total storage capacity of the mobile RAM storage device 810. In this scenario, partial data is stored on the mobile RAM storage device 810. In an embodiment, a second docking station operatively linked to a second mobile RAM storage device (such as in the storage system 106 of FIG. 1) may be used to continue storage of the first data.

In an alternative embodiment, the first storage capacity 812 and the second storage capacity 814 can be predetermined, that is set in size by an OEM or user, for example. In yet another alternative embodiment, the first storage capacity 812 can be adjustable to meet the data size needs of the first host computer 802 if in communication 804 with the docking station 408 before the second host computer 808, with any remaining storage capacity available to serve as the second storage capacity 814. In other words, the first storage capacity 812 and the second storage capacity 814 comprise a total storage capacity wherein the total storage capacity is prioritized for storing the first data 804 when received from the first host computer 802 first in order with any remainder of the total storage capacity of the mobile RAM storage device 810 available the second data 806 when received by the second host computer 808. In yet another alternative embodiment, the first host computer 802 may receive an unavailable or "full" status response for storing the first data 804 at address:sub-address 1:0 402 if the first data size needed for storage exceeds the total storage capacity of the mobile RAM storage device 810. Hence, the storage priority would shift to the second host computer 808.

In one embodiment of the present invention, a library could be configured to support both docking stations, such as docking station 408, for use with a mobile RAM device, such as the mobile RAM device 810, and at least one tape drive adapted to store data on tape cassettes. An example of a hybrid library supporting storage on both real tape cassettes and virtual tape cassettes is the Spectra Logic T950 library.

Figure 9:
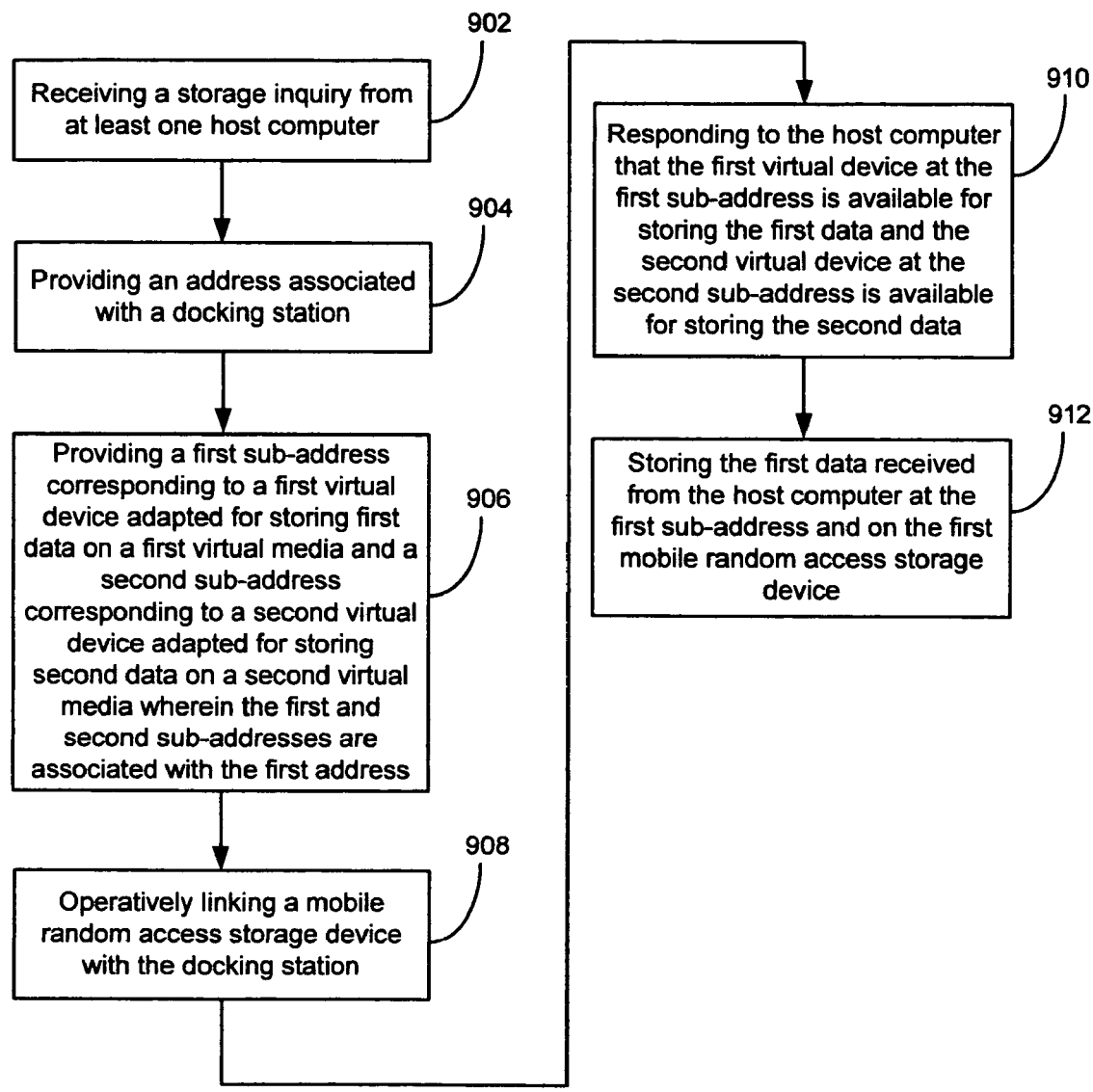
FIG. 9 shows a method to practice an embodiment of the present invention.

Referring now to FIG. 9, shown therein is a method to practice an embodiment of the present invention. It should be recognized that the steps presented in the described embodiments of the present invention do not require any particular sequence. Similar elements are used from FIG. 5 for purposes of illustration in this embodiment. In step 902, a storage system 400 receives an inquiry from at least one host computer 502. An inquiry can be a host 502 or user asking the storage system 400, in effect, "who are you?" and/or "what are you?" Means for receiving the inquiry can be over a SCSI or fiber channel, for example. In step 904, an address [1] 409 associated with a docking station 408 is provided. A means for providing the address [1] 409 can be by transmitting the address [1] 409 associated with the docking station 408 to the host computer 502 over the same path that the inquiry was received over, for example. In step 906, a first sub-address [0] 407 corresponding to a first virtual device, such as the tape drive 414 of FIG. 4B, capable of storing data on a first virtual media, such as a tape cassette, is provided. In addition, a second sub-address [1] 403 corresponding to a second virtual device, such as a disc drive, capable of storing data on a second virtual media, such as a magnetic hard disc, is also provided. The first [0] 407 and second [1] 403 sub-addresses are associated with the first address [1] 409 in the relationship of address:sub-address as shown by blocks 1:0 402 and 1:1 404 respectively. A means for providing the first sub-address [0] 407 and second sub-address [1] 403 can be by transmitting the sub-addresses [0] 407 and [1] 403 associated with address [1] 409 via the same path over which the inquiry was received. In one commercially used SCSI protocol, both the address and sub-address are transmitted to the host computer 502 as a 16 byte data package as address:sub-address, such as 1:0 402 for example. In step 908, a mobile RAM device 410 is operatively linked with the docking station 408. A means for operatively linking the mobile RAM storage device 410 with the docking station 408 could be by wire line or wireless, by inserting a mobile RAM storage device into the docking station 408 whereby electrical connections electrically link the docking station 408 and the mobile RAM storage device 410, just to name a few examples. In step 910, the host computer 502 is transmitted a response indicating that the first virtual device, such as a tape drive 414, at sub-address [0] 407 is available for storage operations and the second virtual device, such as a disc drive 416, at sub-address [1] 403 is also available for storage operations (as is sub-address [2] 405). A means for responding to the host computer 502 that the first and second virtual devices at respective sub-addresses [0] 407 and [1] 403 are available for storage operations could be by transmitting the information over the same path over which the inquiry was received. As one skilled in the art will appreciate, other communication and instruction steps may, but are not required to, occur between the inquiry step 902 and the responding step 910. In step 912, data received from the host computer 502 is stored at the first sub-address [0] 407 on the mobile RAM storage device 410. A means for storing data received from the host computer 502 at the first sub-address [0] 407 can be accomplished by a data conversion program capable of converting data received in a protocol by the host computer 502 to data storable on the mobile RAM storage device 410 such as can be written by or for an OEM, for example. Another means can be accomplished by a data conversion processor chip designed by or for an OEM, for example.

Figure 10:
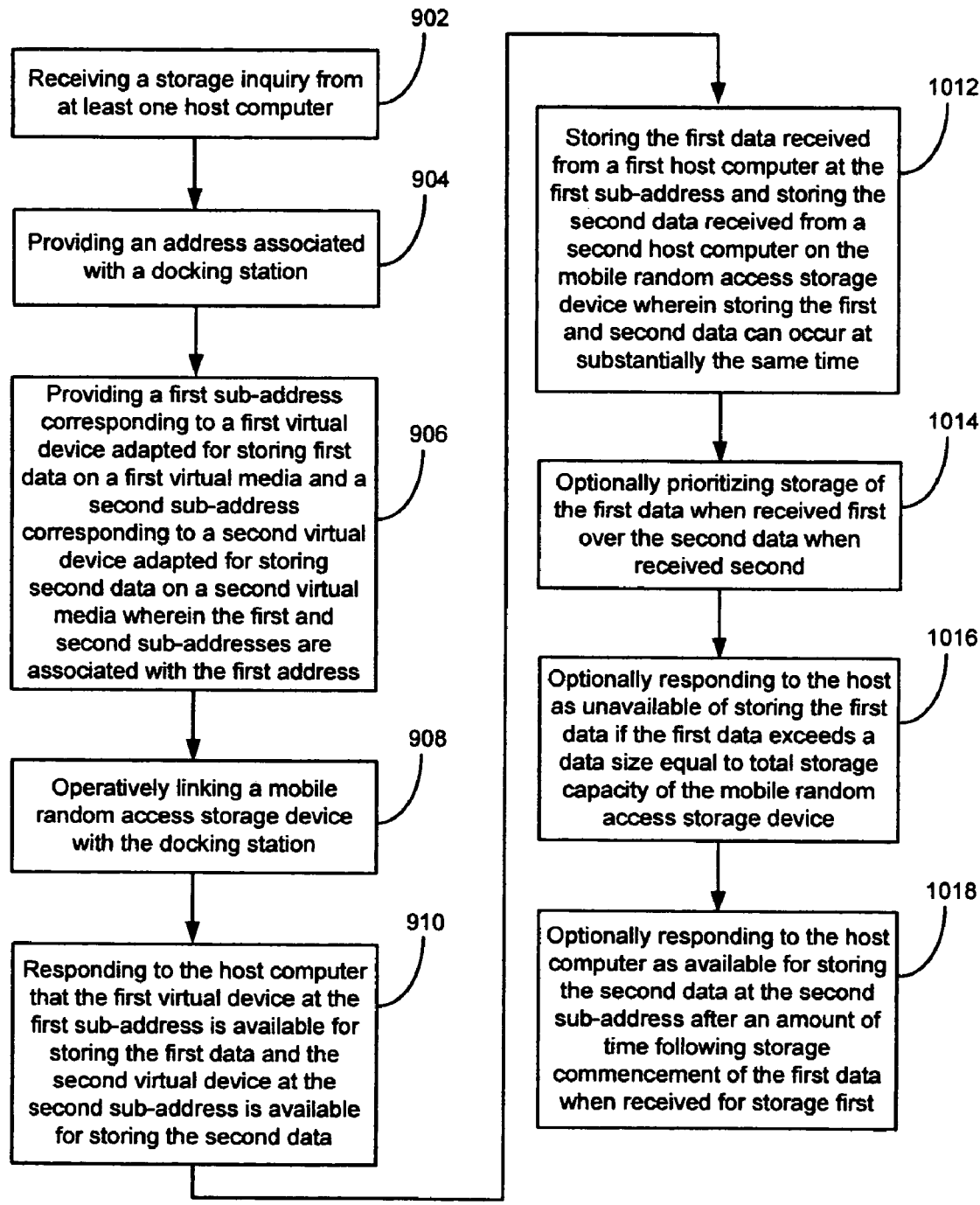
FIG. 10 shows an alternative method consistent with some embodiments of the present invention which includes method steps 902, 904, 906, 908 and 910 from FIG. 9.

FIG. 10 shows several alternative embodiments consistent with the present invention which includes method steps 902, 904, 906, 908 and 910 from FIG. 9. Using similar elements from FIG. 6 for purposes of illustration, step 1012 shows storing both first data received 504 from a first host computer 502 at the first sub-address [0] 407 and second data received 606 from a second host computer 602 on the mobile random access storage device 410 wherein storing the first and second data can occur at substantially the same time. Step 1014 shows an alternative embodiment prioritizing storage of the first data 504 when received first over the second data 606 when received second. Step 1016 is another alternative embodiment consistent with features shown in FIG. 8 showing the step of responding to the first host computer 502 as unavailable or "full" of storing the first data 504 if the first data exceeds a data size equal to total storage capacity of the mobile random access storage device 810. Step 1018 is yet another alternative embodiment showing the step of responding to the second host computer 808 as available for storing the second data 806 at sub-address [2] 405 after an amount of time following storage commencement of the first data 804 when received for storage first. Though two host computers 502 and 602 are used as an example from FIG. 6, one skilled in the art will appreciate that one host computer, such as the host computer 702 from FIG. 7, with two communication links, such as communication links 704 and 706, engaged with the docking station 408 can be substituted for the two communication links 504 and 604 without changing the scope and spirit of the present invention.

Figure 11A:
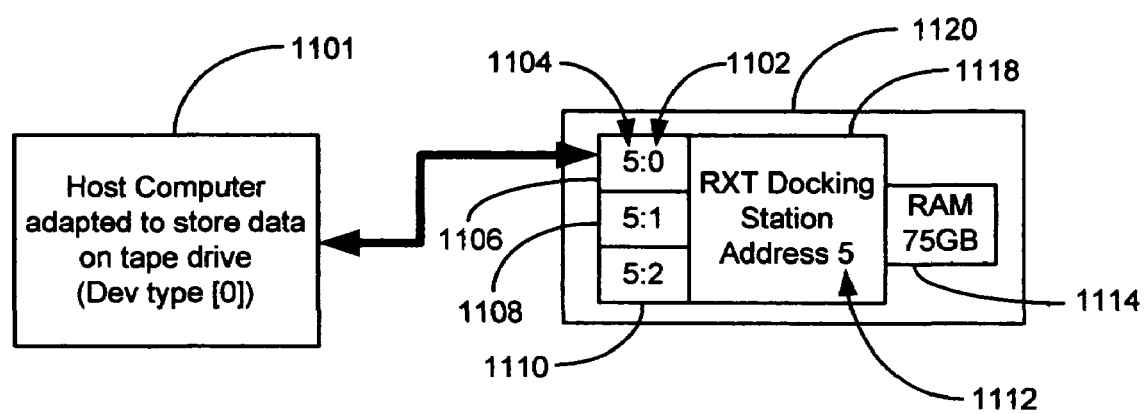
FIGS. 11A and 11B are block diagrams illustrating embodiments wherein the present invention can be commercially practiced.
Figure 11B:
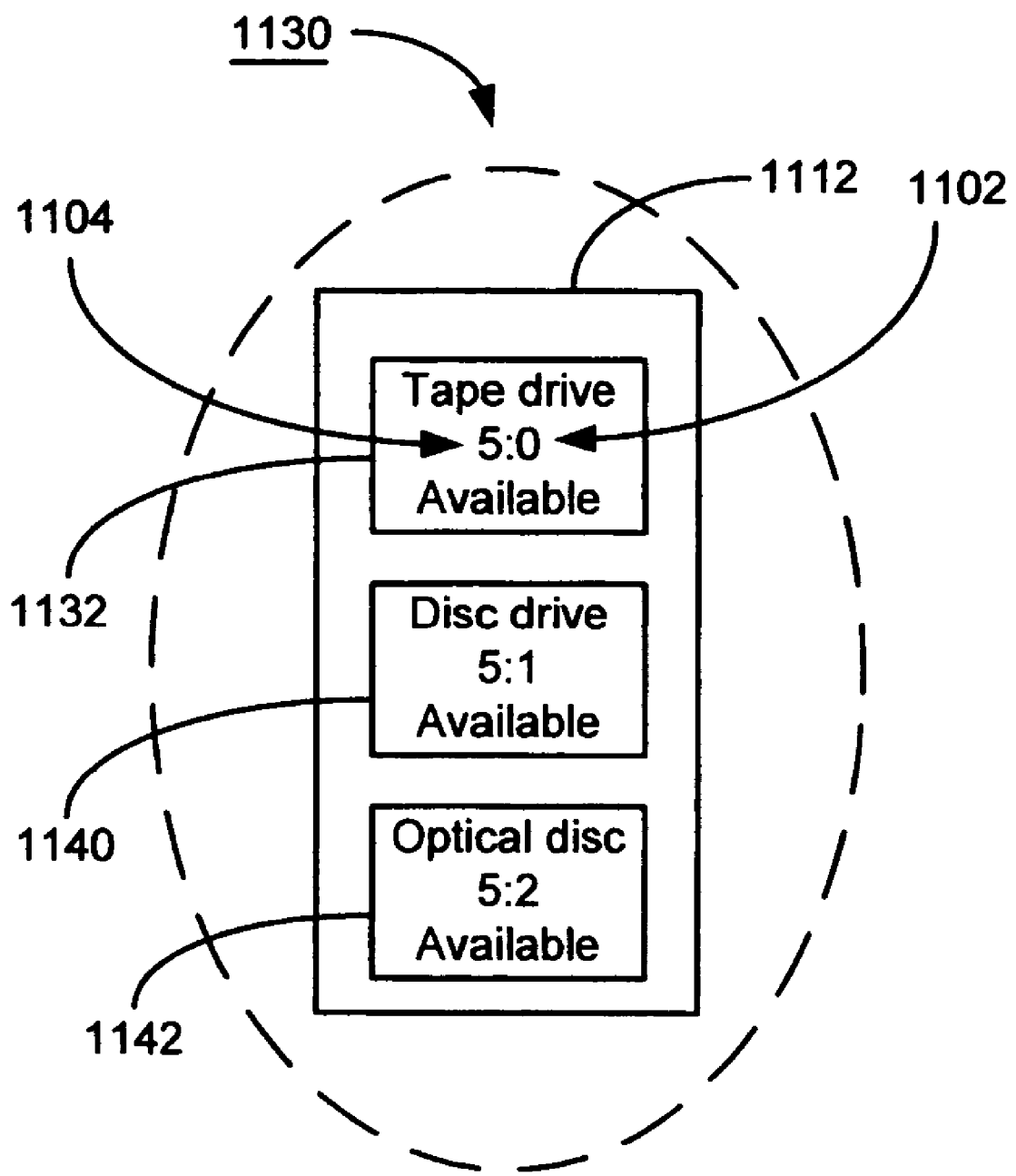

Embodiments of the present invention can be commercially practiced, for example, with an RXT Bank of Drives storage system 200 of FIG. 2, performing as a storage system 106, for use with RXT disc drive magazines 201. The RXT 200 can comprise one or more RXT docking stations 202 adapted to cooperate with an RXT disc drive magazine 201 in an operatively linked state. As previously described, an RXT disc drive magazine 201 encases a plurality of disc drives, such as 308, which can be provided by Seagate Corporation of Scotts Valley, Calif. As shown in FIG. 11A, a host computer 1101 is capable of initiating commands to communicate with the RXT storage system 200. In one exemplary embodiment, an RXT library 1120 comprises one RXT docking station 1118 that is operatively linked with an RXT disc drive magazine 1114. The RXT docking station is associated with an address (such as address [5] 1112) having three sub-addresses, or LUNs (such as LUN [0] 1102) indicated by the address:LUN blocks 5:0 1106, 5:1 1108 and 5:2 1110. As shown by the dashed oval 1130 of FIG. 11B, the address:LUN block 5:0 1106 represents a virtual tape drive system 1132, address:LUN block 5:1 1108 represents a virtual disc drive system 1140 and address: LUN block 5:2 1110 represents a virtual optical disc drive system 1142, as shown by FIG. 11B. The tape drive system 1132, disc drive system 1140 and optical disc system 1142 are all at the same address [5] 1104, however, each have a unique LUN, such as LUN [0] 1102. Because the RXT docking station 1118 is operatively linked with an RXT disc drive magazine 1114, the address:LUNs indicate an availability status for storage operations. The RXT docking station 1118 further comprises controller functionality capable of engaging in storage operations with up to three host computers, such as host computer 1101, at substantially the same time. In this example, the host computer 1101 is shown engaged with the one address:sub-address 5:0 1106 because the host computer 1101 is adapted to store data with tape drive system and address:sub-address 5:0 1106 corresponds to the virtual tape drive system 1132.

In one illustration describing an embodiment of the present invention, the host computer 1101 will poll the library's 1120 SCSI bus (not shown) searching for devices, in this case the RXT docking station 1118. The host computer 1101 will poll LUNs (such as LUN [0] 1102), of the address (such as address [5] 1112) corresponding to the one RXT docking station 1118 (in the case of multiple addresses, all the addresses may be polled for LUNs). In this example, the host 1101 may either create device files or may already have device files associated with each of the virtual devices 1132, 1140 and 1142. When Veritas software, provided by Symantec Corporation of Cupertino, Calif., is used for communication with the docking station 1118, host level device files are used to communicate with the docking station 1118. In one embodiment, the Veritas software will send a SCSI Inquiry command to the virtual drive devices 1132, 1140 and 1142 to obtain vendor and product identification. The host computer 1101 will then send a mode sense command to obtain geometry corresponding to each virtual drive system 1132, 1140 and 1142 (as emulated by the docking station 1118). Geometry can be the configuration of a virtual system corresponding to each virtual drive system 1132, 1140 and 1142. Using the geometry information of the library 1120, the Veritas software can issue commands such as "Read Element Status" to obtain inventory information, such as availability for storage operations. Upon response to the "Read Element Status", each virtual drive system 1132, 1140 and 1142 will return all necessary information for storage operations, such as inventory information and storage space available, in this case 75 GB of available storage space. In this embodiment, the available storage space is on a first come first serve basis. For example, if a first host computer requires 20 GB of storage with address:LUN 5:0

1106 and is in first communication with the RXT docking station 1118 and a second host computer requires 30 GB of storage with address:LUN 5:2 1110 both address:LUNs 1106 and 1110 will be responsive as available, in short, "first come first serve". The Veritas software can then communicate with the tape device 1132 at 5:0 1106, disc drive device 1140 5:1 1106, and optical disc device 1142 5:2 1110 to obtain individual inventory by using a "Test Unit Ready command". Because the docking station 1118 is operatively linked with an RXT disc drive magazine 1114 and the RXT disc drive magazine 1118 is adapted to emulate a device type [0] 1116 which corresponds to the virtual tape system 1116, a Test Unit Ready command is returned to the host computer 1101 indicating that the tape drive 1132 located at 5:0 1106 is loaded with a cassette and available to perform storage operations. The Test Unit Ready command will indicate that the disc drive device 1140 at 5:1 1108 and the optical disc device 1142 at 5:2 1110 are also available for storage operations.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, as described in FIG. 5, though communication between a host computer 502 and the docking station 408 can generally conform with SCSI protocol, the order and initiation of communication can vary depending on the protocol used, such as fiber channel for example, while still maintaining substantially the same functionality without departing from the scope and spirit of the present invention. Further, though communication is described herein as between the host computer 502 and the docking station 408 communication can be received by the storage system 400 and channeled to the docking station 408 without departing from the scope and spirit of the present invention. Finally, although the preferred embodiments described herein are directed to disc drive systems, such as the disc drive magazine 201, and related technology, it will be appreciated by those skilled in the art that the teachings of the present invention can be applied to other systems, without departing from the spirit and scope of the present invention.

It will be clear that the present invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the invention disclosed and as defined in the appended claims.

What is claimed is:

1. A storage system comprising:
    at least one mobile random access storage device capable of storing first and second data;
    at least one docking station;
    the at least one docking station associated with an address wherein the address is identifiable by at least one consumer of data;
    a first and second sub-address associated with the at least one docking station wherein the first and second sub-addresses are identifiable by the at least one consumer of data;
    the first sub-address corresponding to a first virtual device adapted for storing the first data on a first virtual media;
    the second sub-address corresponding to a second virtual device adapted for storing the second data on a second virtual media wherein the second virtual media is a different media type from the first virtual media; and
    the at least one docking station adapted to be responsive to the consumer of data as available for storing the first data at the first sub-address and the second data at the second sub-address when the at least one docking station is operatively linked with the at least one mobile random access storage device.

2. The storage system of claim 1 wherein the at least one docking station is responsive to a first consumer of data as available for storing the first data at the first sub-address and the at least one docking station is responsive to a second consumer of data as available for storing the second data at the second sub-address.

3. The storage system of claim 2 wherein storing the first and the second data occur at substantially the same time.

4. The storage system of claim 1 wherein the mobile random access storage device comprises a first storage capacity that is available for storing the first data at the first sub-address and a second storage capacity that is available for storing the second data at the second sub-address.

5. The storage system of claim 4 wherein the first and second storage capacities are predetermined.

6. The storage system of claim 4 wherein the first and second storage capacities comprise a total storage capacity and wherein the total storage capacity is prioritized for storing the first data when received first with any remainder of the total storage capacity for storing the second data when received second.

7. The storage system of claim 6 further comprising an unavailable status response to the at least one consumer of data for storing the first data if the first data exceeds a data size equal to the total storage capacity.

8. The storage system of claim 1 wherein the at least one docking station is responsive to the at least one consumer of data as available for storing the second data at the second sub-address after an amount of time following storage commencement of the first data when received for storage first.

9. The storage system of claim 8 wherein the amount of time is zero.

10. The storage system of claim 1 wherein the first and second virtual devices are selected from the group consisting of: flash memory device, magnetic disc drive, disc drive magazine, optical media drive, magneto-optical drive, and floppy disc drive.

11. The storage system of claim 1 wherein the first virtual device is a tape drive and the first media is a tape cassette adapted to cooperate with the tape drive.

12. The storage system of claim 1 wherein the mobile random access storage device is selected from the group consisting of: flash memory device, magnetic disc drive, disc drive magazine, optical media drive, magneto-optical drive, and floppy disc drive.

13. The storage system of claim 1 further comprising:
    capability of storing third data on the mobile random access storage device;
    a third sub-address associated with the at least one docking station wherein the third sub-address is identifiable by the at least one consumer of data;
    the third sub-address corresponding to a third virtual device adapted for storing the third data on a third virtual media wherein the third virtual media is a different media type from the first virtual media; and
    the at least one docking station adapted to be responsive to the at least one consumer of data as available for storage operations at the third sub-address when the at least one docking station is operatively linked with the mobile random access storage device.

14. A method for saving information in a storage system comprising:
receiving an inquiry from at least one consumer of data;
providing an address associated with a docking station;
providing a first sub-address corresponding to a first virtual device adapted for storing first data on a first virtual media and a second sub-address corresponding to a second virtual device adapted for storing second data on a second virtual media wherein the second virtual media is a different media type than the first virtual media and wherein the first and second sub-addresses are associated with the first address;
operatively linking a mobile random access storage device with the docking station;
responding to the consumer of data that the first virtual device at the first sub-address is available for storing the first data and the second virtual device at the second sub-address is available for storing the second data;
storing the first data received from the consumer of data at the first sub-address on the mobile random access storage device.

15. The method of claim 14 wherein the first sub-address in the responding step represents a virtual tape drive adapted to cooperate with a virtual tape cassette wherein the virtual tape drive and the virtual tape cassette are comprised by a virtual tape library responsive to a tape storage protocol.

16. The method of claim 14 further comprising:
providing a third sub-address corresponding to a third virtual device adapted for storing third data on a third virtual media wherein the third virtual media is a different media type than the first virtual media and wherein the third sub-addresses is associated with the first address;
responding to the consumer of data that the third virtual device at the third sub-address is available for storing the third data;
storing the third data received from the consumer of data at the third sub-address and on the mobile random access storage device.

17. The method of claim 14 further comprising storing the first data received from a first consumer of data at the first sub-address and the second data received from a second consumer of data on the mobile random access storage device wherein storing the first and second data can occur at substantially the same time.

18. The method of claim 14 further comprising prioritizing storage of the first data when received first over the second data when received second.

19. The method of claim 18 further comprising responding to the host as unavailable of storing the first data if the first data exceeds a data size equal to total storage capacity of the mobile random access storage device.

20. The method of claim 18 further comprising responding to the consumer of data as available for storing the second data at the second sub-address after an amount of time following storage commencement of the first data when received for storage first.

21. A storage system comprising:
at least one mobile random access storage device capable of storing first and second data;
at least one docking station adapted to receive and transmit the first and second data;
the at least one mobile random access storage device adapted to function as a first and a second virtual of storage device wherein the first virtual device is different from the second virtual device;
the at least one mobile random access storage device capable of storing the first data intended for storage on the first virtual storage device and the second data intended for storage on the second virtual storage device when the at least one mobile random access storage device is operatively linked with the at least one docking station.

22. A storage system comprising:
at least one mobile random access storage device capable of storing sequential data and random data;
at least one docking station adapted to receive and transmit the sequential data and the random data;
the at least one mobile random access storage device adapted to function as a virtual sequential storage device and a virtual random storage device;
the at least one mobile random access storage device capable of storing the sequential data intended for storage on the virtual sequential storage device and the random data intended for storage on the virtual random storage device when the at least one mobile random access storage device is operatively linked with the at least one docking station.

23. A storage system comprising:
at least one mobile random access storage device capable of storing sequential data and random data;
at least one docking station;
the at least one docking station associated with an address wherein the address is identifiable by at least one consumer of data;
a first and second sub-address associated with the at least one docking station wherein the first and second sub-addresses are identifiable by the at least one consumer of data;
the first sub-address corresponding to a virtual sequential storage device adapted for storing the sequential data on a virtual sequential storage media;
the second sub-address corresponding to a virtual random storage device adapted for storing the random data on a virtual random storage media; and
the at least one docking station adapted to be responsive to the at least one consumer of data as available for storing the sequential data at the first sub-address and the random data at the second sub-address when the at least one docking station is operatively linked with the at least one mobile random access storage device.

* * * * *